United States Patent [19]

van der Lely et al.

[11] 3,939,918

[45] *Feb. 24, 1976

[54] TINE MOUNTINGS

[76] Inventors: Cornelis van der Lely, 7, Bruschenrain, Zug, Switzerland; Ary van der Lely, 10 Weverskade, Maasland, Netherlands

[ * ] Notice: The portion of the term of this patent subsequent to May 7, 1991, has been disclaimed.

[22] Filed: Jan. 28, 1974

[21] Appl. No.: 436,892

Related U.S. Application Data

[62] Division of Ser. No. 218,667, Jan. 18, 1972, Pat. No. 3,809,166.

[52] U.S. Cl. .................................. 172/763; 172/59
[51] Int. Cl.² .................................... A01B 15/00
[58] Field of Search ........... 172/762, 763, 112, 753, 172/681, 691, 765; 56/400

[56] References Cited
UNITED STATES PATENTS

| | | | |
|---|---|---|---|
| 485,020 | 10/1892 | Sobey | 172/763 X |
| 1,219,107 | 3/1917 | Jones | 172/763 X |
| 2,582,364 | 1/1952 | Tice | 172/112 X |
| 3,657,785 | 4/1972 | Vissers | 172/762 X |

FOREIGN PATENTS OR APPLICATIONS 1,940,988  12/1970  Germany .............................. 172/59

*Primary Examiner*—Edgar S. Burr
*Assistant Examiner*—R. T. Rader
*Attorney, Agent, or Firm*—Mason, Mason & Albright

[57] ABSTRACT

A cultivator tine and mounting includes an elongated tube support that rotates about an upwardly extending shaft that is secured to a bracket at the upper central portion on the support. Each end of the support is closed by tine holders having vertical passageways with tapering surfaces to secure upper fastening portions of the tines. Each tine includes a soil-working portion which is integrally joined to the working portion. A collar with a conical surface is located adjacent and above the juncture. Also, projections on the tine immediately adjacent the collar extend laterally beyond the collar and the projections are received in their holders.

6 Claims, 2 Drawing Figures

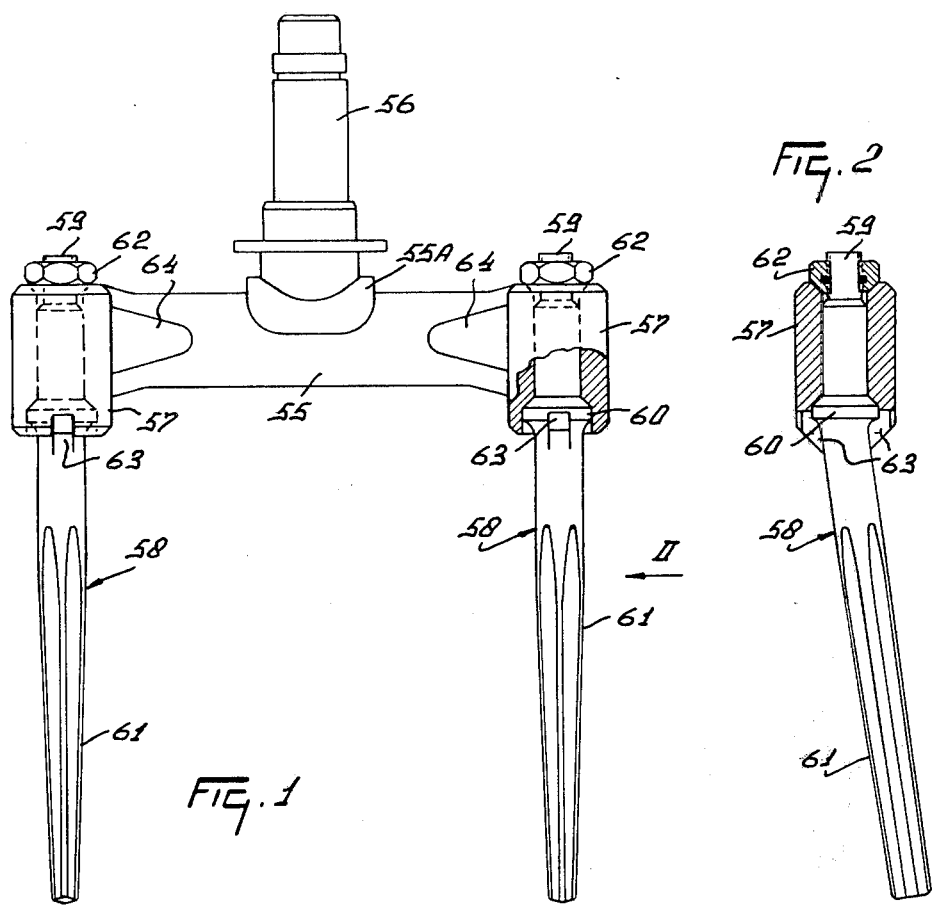

TINE MOUNTINGS

This application is a division application of copending Ser. No. 218,667 now U.S. Pat. No. 3,809,166, filed Jan. 18, 1972.

Strong resistance to the passage of rotating tines through soil has resulted in complicated and relatively expensive designs for the mountings and tines. It is an object of the present invention to provide a strong and relatively inexpensive tine and mounting for holding tines in working position, the parts being assembled for ease of service and replacement.

For a better understanding of the invention, and to show how the same may be carried into effect, reference will now be made, by way of example, to the accompanying drawings, in which:

FIG. 1 is a part-sectional elevation, showing details of a tine construction in accordance with the invention, and FIG. 2 is a part-sectional elevation as seen in the direction indicated by an arrow II in FIG. 1.

FIGS. 1 and 2 of the drawings illustrate a construction in which a substantially horizontal support 55 is secured centrally to a vertical or substantially vertical shaft 56 affording the axis of rotation of soil-working member of a rotary harrow. The tine support 55 is afforded by a tube of circular cross-section in the embodiment of FIGS. 1 and 2 of the drawings but the tube could be of oval or angular cross-section if preferred. The connections between the shaft 56 and the tine support 55 are afforded by wrought iron brackets 55A each of which is of substantially semi-cylindrical formation so that it embraces an upper central region of the corresponding support tube 55 throughout substantially 180°, rigid connections between the brackets 55A and supports 55 being established by welding. The construction of the brackets 55A enables the supports 55 to be secured thereto in a simple, rapid and effective manner.

Each outermost end of the support 55 is closed by a corresponding substantially vertically disposed tine holder 57 carried by said support. The upper and lower ends of a holder 57 are shaped to define respectively downwardly and upwardly tapering conical surfaces whose angles of conicity are substantially 90°. The holders 57 receive the fastening portions 59 of corresponding tines 58. Each tine 58 has a lower downwardly tapering soil-working portion 61 whose longitudinal axis makes an angle of substantially 8° with the longitudinal axis of the fastening portion 58. Each tine 58 has a collar 60 just above the integral junction between its fastening portion 59 and its soil-working portion 61, said collar 60 having an upwardly directed conical surface shaped to cooperate with the internal conical surface at the bottom of the holder 57. An upper end of the fastening portion 59 is screw-threaded and cooperates with a nut 62 having a downwardly directed conical surface that will abut against the internal conical surface at the top of the holder 57 when the nut is tightened. As can be seen in FIG. 2 of the drawings, the nut 62 may incorporate an insert designed to prevent the nut from working loose. Each tine 58 has two diametrically opposed projections 63 at, and just beneath, the level of its collar 60, said projections 63, whose lower surfaces are inclined to the longitudinal axis of the soil-working portion, being received in corresponding recesses at the lower end of the holder 57. Once the fastening portion 59 of each tine 58 has been placed in its appointed position and has had the corresponding nut 62 applied thereto, the cooperation of the projections 63 and recesses at the foot of the tine holder 57 prevents that tine from turning angularly in the holder. The nut 62 can be loosened to allow the tine 58 to be turned about 180° in the holder 57 so that the soil-working portion 61 of the tine can "lead" rather than "trail" with regard to the intended direction of rotation of the whole soil-working member. The rigidity of the connections between the holders 57 and the supports 55 is strengthened, in this embodiment, by the provision of stiffening ridges 64.

What is claimed is:

1. A tine for a rotary harrow, comprising an upper fastening portion and a lower soil-working portion, said fastening portion and said soil-working portion each having a longitudinal axis, the longitudinal axes of the portions being angled with respect to one another, said fastening portion comprising an upper threaded end portion adapted to receive a fastening nut, a collar having an encircling upper conical surface, an integral junction between said fastening and said soil-working portions, said collar being positioned immediately above said junction, said conical surface facing said threaded end portion, integral projection means on said tine, said projection means being located adjacent said collar and extending laterally beyond the periphery of said collar and in a direction substantially perpendicular to a plane extending through the longitudinal axis of said fastening portion.

2. A tine as claimed in claim 1, wherein there are a plurality of projections and said projections have surfaces which face said fastening portion.

3. A tine as claimed in claim 1, wherein the angle between said axes is about 8°.

4. A cultivator tine mounting comprising an elongated substantially horizontal hollow support having a generally cylindrical tine holder at each end of said support, each tine holder comprising a substantially vertical passageway with upper and lower ends shaped to define, respectively, downwardly and upwardly tapering conical surfaces, said holders being connected to the outermost ends of said hollow support and said outermost ends terminating in said holders, an upwardly extending shaft connected to said support at the upper central region thereon, said shaft defining an axis about which said support is rotatable, and said shaft being connected to said support with a semi-circular bracket which embraces said upper central region.

5. The mounting of claim 4, wherein said bracket and holders have welded connections to said support.

6. The mounting of claim 4, wherein the lower end of each passageway has recess means for receiving a tine.

* * * * *